(12) United States Patent
Yamada et al.

(10) Patent No.: US 9,660,507 B2
(45) Date of Patent: May 23, 2017

(54) METHOD OF MANUFACTURING STATOR CORE AND THE STATOR CORE

(71) Applicant: Toshiba Industrial Products Manufacturing Corporation, Mie-gun, Mie (JP)

(72) Inventors: Toyonobu Yamada, Mie (JP); Tadashi Morishima, Mie (JP); Katsumi Kinoshita, Mie (JP); Takayuki Akatsuka, Mie (JP); Hiroshi Horai, Mie (JP); Yasuo Hirano, Mie (JP); Masanori Ohashi, Mie (JP); Takeo Kaito, Mie (JP)

(73) Assignee: Toshiba Industrial Products Manufacturing Corporation, Mie (JP)

( * ) Notice: Subject to any disclaimer, the term of this patent is extended or adjusted under 35 U.S.C. 154(b) by 666 days.

(21) Appl. No.: 14/010,432

(22) Filed: Aug. 26, 2013

(65) Prior Publication Data
US 2014/0091672 A1 Apr. 3, 2014

Related U.S. Application Data

(63) Continuation of application No. PCT/JP2011/074143, filed on Oct. 20, 2011.

(30) Foreign Application Priority Data

Feb. 25, 2011 (JP) ................................. 2011-039882

(51) Int. Cl.
*H02K 1/06* (2006.01)
*H02K 15/02* (2006.01)
(Continued)

(52) U.S. Cl.
CPC ............. *H02K 15/02* (2013.01); *H02K 1/165* (2013.01); *H02K 1/185* (2013.01); *H02K 15/024* (2013.01); *Y10T 29/49009* (2015.01)

(58) Field of Classification Search
CPC .................................. H02K 15/02; H02K 1/18
(Continued)

(56) References Cited

U.S. PATENT DOCUMENTS 3,650,167 A * 3/1972 Hoffmeyer ............... H02K 1/16
29/596
4,536,952 A * 8/1985 Shinryo ................... H02K 1/06
29/596
(Continued)

FOREIGN PATENT DOCUMENTS

CN 1578058 2/2005
CN 1756028 4/2006
(Continued)

OTHER PUBLICATIONS

Japanese Office Action issued in JP 2011-039882 on Sep. 3, 2013.
(Continued)

*Primary Examiner* — Jose Gonzalez Quinone
(74) *Attorney, Agent, or Firm* — DLA Piper LLP US

(57) ABSTRACT

A method of manufacturing a stator core includes die-cutting iron core materials from a band-shaped magnetic steel sheet and stacking the materials. Each material includes an inner circumference formed with three interconnecting lugs. At least one of the lugs included in one of two rows is located between the materials lengthwise adjacent to each other in the other row. Marginal regions are located in parts of the sheet located between the lugs of the materials adjacent to each other in a lengthwise direction of the sheet in a common row, between the material of the one row and the material of the other row and between the materials to be die-cut and each end of the sheet, respectively. The marginal regions are sized to be approximate to a web width in order to join remaining materials after the materials have been die-cut.

4 Claims, 6 Drawing Sheets

(51) Int. Cl.
*H02K 1/18* (2006.01)
*H02K 1/16* (2006.01)

(58) Field of Classification Search
USPC .... 310/216.049, 216.045, 216.061, 216.062; 29/596
See application file for complete search history.

(56) References Cited

U.S. PATENT DOCUMENTS

| | | | |
|---|---|---|---|
| 2006/0071572 | A1 | 4/2006 | Kunkel |
| 2009/0064485 | A1 | 3/2009 | Kunkel |
| 2011/0024489 | A1* | 2/2011 | Sakakibara et al. .............. 234/1 |
| 2013/0293060 | A1 | 11/2013 | Hasuo et al. |
| 2014/0091672 | A1 | 4/2014 | Yamada et al. |

FOREIGN PATENT DOCUMENTS

| | | | |
|---|---|---|---|
| JP | 53080503 | A * | 7/1978 |
| JP | 58-201549 | | 11/1983 |
| JP | 58201549 | A * | 11/1983 |
| JP | 01-321848 | | 12/1989 |
| JP | 2005-318763 | | 11/2005 |
| JP | 2006-109691 | | 4/2006 |
| JP | 2006-280017 | | 10/2006 |
| JP | 2007-181297 | | 7/2007 |
| JP | 2009195031 | A * | 8/2009 |
| JP | 2009-254086 | | 10/2009 |
| JP | 2011-036039 | | 2/2011 |
| JP | 2011-078210 | | 4/2011 |
| JP | 2012-170222 | | 9/2012 |
| JP | 2012-178920 | | 9/2012 |

OTHER PUBLICATIONS

English Language Translation of Japanese Office Action issued in JP 2011-039882 on Sep. 3, 2013.
Japanese Office Action issued in JP 2011-039882 on Oct. 11, 2013.
English Language Translation of Japanese Office Action issued in JP 2011-039882 on Oct. 11, 2013.
English Language Abstract and Translation of JP 2009-254086 published on Oct. 29, 2009.
English Language Abstract and Translation of JP 2005-318763 published on Nov. 10, 2005.
English Language Abstract and Translation of JP 2012-170222 published on Sep. 6, 2012.
First Notification of Opinion on Examination issued in Chinese Application No. 201180068497.5 dated Apr. 3, 2015 with Translation.
English Language Abstract of JP 58-201549 published on Nov. 24, 1983.
English Language Abstract of JP 2011-036039 published on Feb. 17, 2011.
English Language Translation of JP 2011-036039 published on Feb. 17, 2011.
English Language Abstract of JP 2006-109691 published on Apr. 20, 2006.
English Language Translation of JP 2006-109691 published on Apr. 20, 2006.
English Language Abstract of JP 01-321848 published on Dec. 27, 1989.
English Language Abstract and Translation of JP 2007-181297 published Jul. 12, 2007.
International Search Report issued in PCT/JP2011/074143 dated Dec. 13, 2011.
English Language Translation of International Search Report issued in PCT/JP2011/074143 dated Dec. 13, 2011.
Written Opinion issued in PCT/JP2011/074143 dated Dec. 13, 2011.
English Language Translation for Written Opinion issued in PCT/JP2011/074143 dated Dec. 13, 2011.
Mexican Office Action issued in MX/a/2013/009747 on Aug. 7, 2014.
Notification of Opinion on Examination issued in Chinese Application No. 201180068497.5 dated Oct. 21, 2015 with English Language Translation.
International Search Report (with English Translation) issued in PCT/JP2014/066163 dated Sep. 2, 2014.
Written Opinion (with English Translation) issued in PCT/JP2014/066163 dated Sep. 2, 2014.
International Preliminary Report on Patentability issued in PCT/JP2014/066163 dated Mar. 29, 2016.
English Language Abstract and Translation of JP 2012-178920 published on Sep. 13, 2012.
G/ 2006 English Language Abstract and Translation of JP 2006-280017 published on Oct. 12, 2006.
English Language Abstract and Translation of JP 2011-078210 published on Apr. 14, 2011.
English Language Abstract and Translation of CN 1756028 published on Apr. 5, 2006.
English Language Abstract and Translation of CN 1578058 published on Feb. 9, 2005.
Related U.S. Appl. No. 15/080,881.

* cited by examiner

METHOD OF MANUFACTURING STATOR CORE AND THE STATOR CORE

CROSS-REFERENCE TO RELATED APPLICATIONS

This application is a continuation of International Application No. PCT/JP2011/0741437, filed Oct. 20, 2011. International Application No PCT/JP2011/0741437 is based upon and claims the benefit of priority from the prior Japanese Patent Application No 2011-039882 filed Feb. 25, 2011. The entirety of all of the above listed applications are incorporated herein by reference.

FIELD

Embodiments described herein relate to a method of manufacturing a stator core and the stator core.

BACKGROUND

A stator core constituting a stator of a rotating electrical machine is constructed, for example, by stacking a number of annular iron core materials. The iron core material has an outer circumference formed with a plurality of lugs protruding radially outward from the outer circumference. The lugs are formed with respective holes. Connecting members are inserted into the holes to interconnect the iron core materials in a stacking direction.

In a conventional stator core, for example, a band-shaped magnetic steel sheet is punched out by a press thereby to be formed into the iron core material. In this case, a band-shaped magnetic steel sheet has portions which are to be punched out by the press and are arranged into a plurality of rows along a lengthwise direction of the sheet.

When an iron core material having lugs is manufactured, a large amount of material tends to remain around a part of a magnetic steel sheet corresponding to a lug of the iron core material to be punched out. As a result, improving the yield of material has been required.

SUMMARY

Therefore, embodiments described herein provide a method of manufacturing a stator core, which can improve the yield of material used in the manufacture when a stator core constructed by stacking iron core materials having lugs is manufactured and further provide a stator core manufactured by the above-described manufacturing method.

According to embodiments, a method of manufacturing a stator core includes a step of die-cutting iron core materials from a band-shaped magnetic steel sheet. Each iron core material is formed into an annular shape and has an inner circumference formed with a plurality of slots and three interconnecting lugs, each lug being formed into a rectangular shape extending radially outward from an annular outer circumference of the magnetic steel sheet. Each lug has a distal end formed into a semicircular arc shape. The method further includes a step of stacking a number of the iron core materials. In the die-cutting process, the magnetic steel sheet includes parts to be die-cut as the iron core materials and the parts are arranged in two rows in a widthwise direction of the magnetic steel sheet when At least one of the lugs included in one of the two rows is located between the iron core materials lengthwise adjacent to each other in the other row. Marginal regions are provided in parts of the magnetic steel sheet located between the lugs of the iron core materials adjacent to each other in a lengthwise direction of the magnetic steel sheet in a common row, between the iron core material of the one row and the iron core material of the other row and between the iron core materials to be die-cut and each end of the magnetic steel sheet, respectively. The marginal regions are sized to be approximate to a web width in order to join remaining materials after the iron core materials have been die-cut from the magnetic steel sheet.

According to embodiments, a stator core is constructed by stacking a number of iron core materials die-cut from a band-shaped magnetic steel sheet. Each one of the iron core materials is formed into an annular shape and has an inner circumference formed with a plurality of slots. Each iron core material has three interconnecting lugs, each lug being formed into a rectangular shape extending radially outward from an annular outer circumference of the magnetic steel sheet. Each lug has a distal end formed into a semicircular arc shape. The magnetic steel sheet includes parts to be die-cut as the iron core materials and the parts are arranged in two rows in a widthwise direction of the magnetic steel sheet. At least one of the lugs included in one of the two rows is located between the iron core materials lengthwise adjacent to each other in the other row. Marginal regions are provided in parts of the magnetic steel sheet located between the lugs of the iron core materials adjacent to each other in a lengthwise direction of the magnetic steel sheet in a common row, between the iron core material of the one row and the iron core material of the other row and between the iron core materials to be die-cut and each end of the magnetic steel sheet, respectively. The marginal regions are sized to be approximate to a web width in order to join remaining materials aft the iron core materials have been die-cut from the magnetic sheet, whereby a number of the iron core materials die-cut from the magnetic steel sheet is constructed into the stator core.

DETAILED DESCRIPTION

Figure 1:
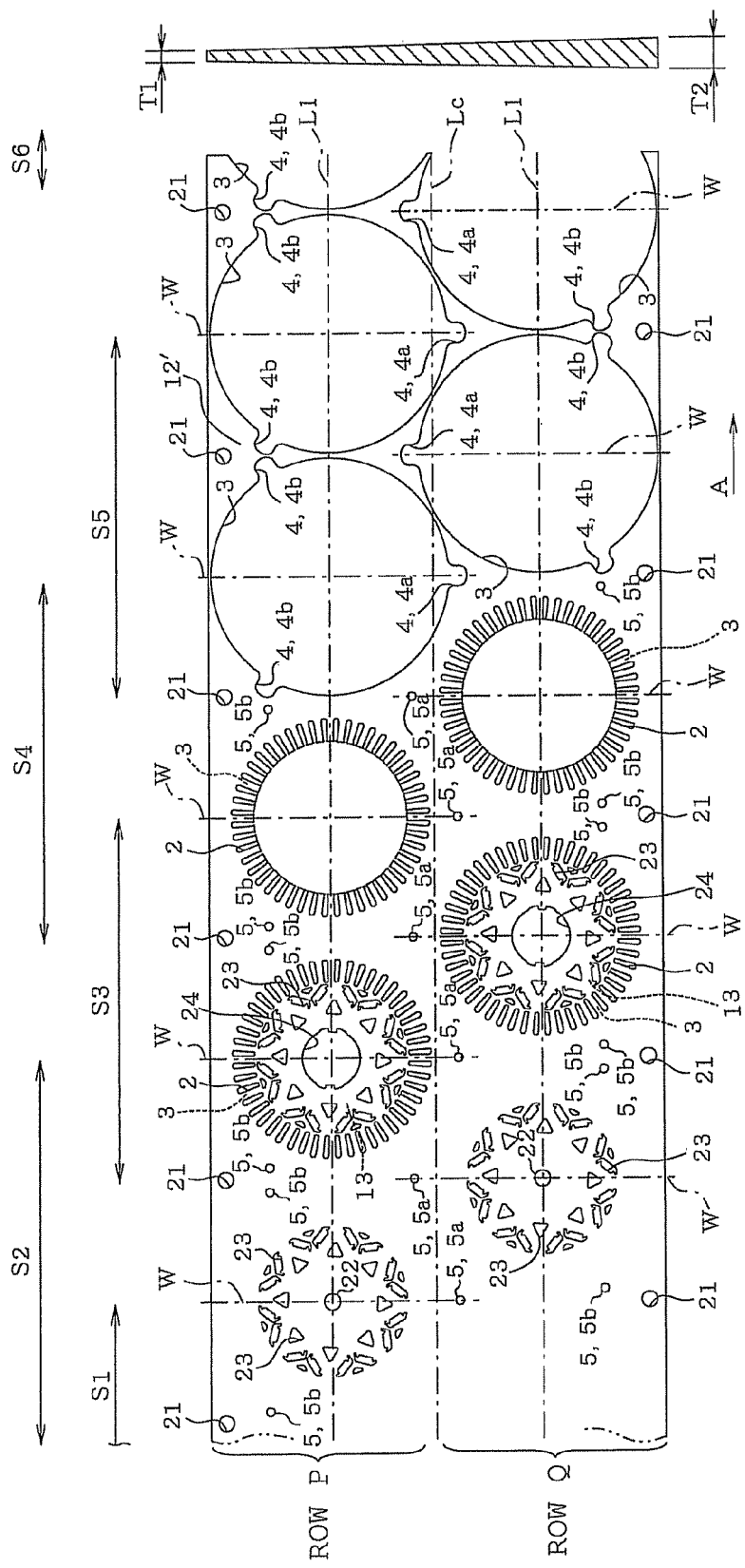
FIGS. 1A and 1B are a plan view of a base material to be machined, showing configurations to be die-cut in a die-cutting process and a sectional view of the base material, showing sheet thickness deviation, both showing a first embodiment, respectively.

The following embodiments are directed to a method of manufacturing a stator core used in a stator of rotating electrical machine. In this case, the stator is used in a rotating electrical machine of the inner rotor type. The embodiments will be described with reference to the accompanying drawings. An axial direction of the stator core, a stacking direction of the iron core material and a thickness direction of the iron core material are identical with one another.

A first embodiment will now be described with reference to FIGS. 1A to 4. A stator core 1 as shown in FIG. 2 is made of a magnetic steel sheet and is formed into a cylindrical shape. A space is defined at the inner circumferential side of the stator core 1. A rotor (not shown) is to be disposed in the space. The inner circumference of the stator core 1 has a plurality of slots 2 provided for accommodating windings. The slots 2 are formed circumferentially at regular intervals. The stator core 1 is fixed in a frame for housing a rotating electrical machine although the frame is not shown. The stator core 1 is constructed by stacking a number of iron core materials 3.

Each iron core material 3 is formed into the shape of an annular plate. Each iron core material 3 has an inner circumference having a plurality of slots 2 formed circumferentially at regular intervals. Reference numeral 2 is used to designate both slots of the stator core 1 and slots of each iron core 3 for the sake of convenience.

Each iron core material 3 has m number of interconnecting lugs 4 which are provided for interconnecting the iron core materials 3 into an integral form in a stacking direction when a plurality of the iron core materials 3 is stacked. The number m may be set to an integer equal to or larger than 2, or more preferably, an odd number equal to or larger than 3, or further more preferably, 3. The number m is set to 3 in the embodiment.

Each lug 4 protrudes radially outward from an outer circumference of the iron core material 3. More specifically, each lug 4 is formed into a generally rectangular shape and protrudes radially outward from the outer circumference of the iron core material 3. Each lug 4 has a distal end formed into the shape of a generally semicircular arc. Each lug 4 is sized so as to allow a hole 5 to be formed as will be described later. Each lug 4 protrudes in a direction from an imaginary center of the iron core material 3 toward the center of the semicircular arc thereof. The lugs 4 are disposed on the outer circumference of each iron core material 3 circumferentially at regular intervals. In this case, since m=3, an interval between lugs adjacent to each other is obtained as (360 ÷ 3°), that is, 120°.

Each lug 4 has a centrally located cylindrical hole 5 formed therethrough in the direction of thickness of the iron core material 3, as shown in FIG. 2. The stator core 1 is constructed by stacking a number of iron core materials 3 in the direction of thickness of each iron core material 3 so that the lugs 4 of the iron core materials 3 overlap with one another. In this case, the holes 5 of the iron core materials 3 adjacent to one another in the thickness direction of each iron core material 3, that is, in the stacking direction are lined or overlap one another in the stacking direction, whereby the cylindrical holes 5 are formed. Interconnecting members (not shown) are inserted into the holes 5 respectively. Each interconnecting member is constituted by a metal binding pipe, for example. Accordingly, each hole 5 has an opening that is set so that the interconnecting member or in this case, the binding pipe is insertable into each hole 5. The binding pipe inserted into each hole 5 is spread or expanded over an entire length thereof in the stacking direction of the iron core materials 3. Consequently, a number of iron core materials 3 are integrally interconnected with the result that the stator core 1 is constructed.

The method of manufacturing the stator core 1 according to the embodiment will be described with reference to FIGS. 1A to 4. Each iron core material 3 constituting the stator core 1 is formed by cutting a base material 11 that is a band-shaped magnetic steel sheet as shown in FIG. 3 into a predetermined size, for example and die-cutting each iron core material 3 from the base material 11 by a press machine.

The base material 11 is formed into a band shape by rolling. Accordingly, the base material 11 has different thicknesses, for example, in widthwise portions thereof due to differences in load such as a roller in the rolling, as shown in FIG. 3. More specifically, the base material 11 has a plate thickness deviation. The base material 11 having the above-mentioned plate thickness deviation has a widthwise direction that is the same as an axial direction of the roller.

In this case, a widthwise central part of the base material 11 is swollen, and both widthwise ends of the base material 11 are thinnest. Reference symbol "$T_1$" designates both widthwise ends of the base material 11, that is, a smallest widthwise thickness. Reference symbol "$T_2$" designates a largest widthwise thickness, that is, a widthwise central part of the base material 11.

Figures 3A, 3B:
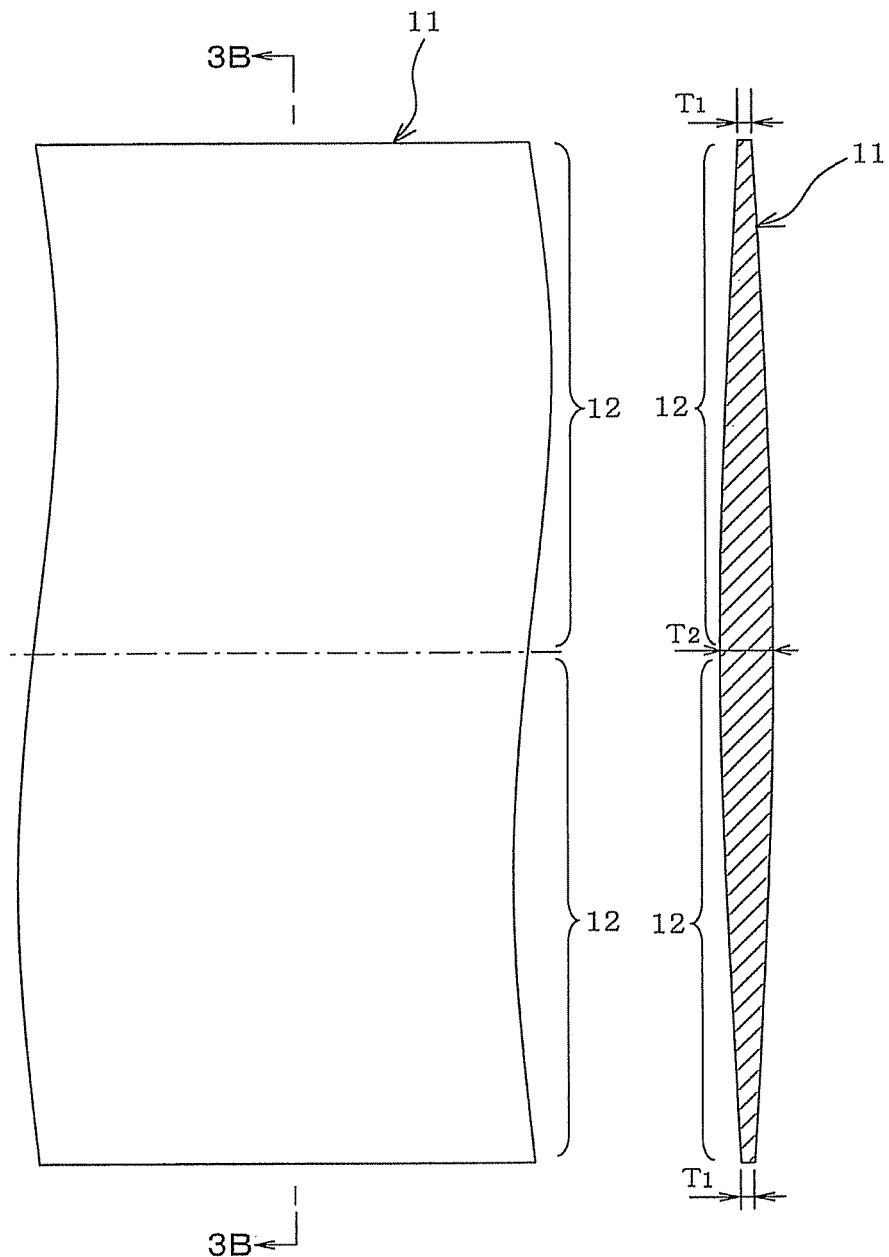
FIGS. 3A and 3B are a plan view of the base material and a sectional view taken along line 3B-3B in FIG. 3A, respectively.

A cutting step is firstly executed in the embodiment. In the cutting step, the base material 11 as shown in FIG. 3 is cut so that a predetermined widthwise dimension is obtained. The base material 11 is cut along the widthwise center thereof into two parts in the embodiment. As a result, two band-shaped processed base materials 12 to be machined are obtained, as shown in FIGS. 1A, 1B, 3A, 3B and 4. That is, each base material 12 to be machined is a band-shaped magnetic steel sheet obtained by dividing the base material 11 into halves. Accordingly, each base material 12 to be machined (hereinafter, "base material 12") has one widthwise end with a thickness $T_1$ and the other widthwise end with a thickness $T_2$. FIGS. 1A and 1B show imaginary lines W, $L_1$ and $L_C$. The imaginary line W passes through the center of the iron core material 3 to be die-cut and extends in the widthwise direction of the base material 12 to be machined. The imaginary line $L_1$ passes through the center of the iron core material 3 to be die-cut and extends in the lengthwise direction of the base material 12 to be machined. The imaginary line $L_C$ passes through the widthwise center of the base material 12 to be machined and extends in the lengthwise direction of the base material 12 to be machined.

The base materials 12 obtained by cutting the base material 11 are wound into a coil shape thereby to be handled.

Subsequently, a die-cutting process is executed in which the iron core materials 3 and the like are die-cut from the base material 12. The equipment executing the die-cutting process includes a press machine which die-cuts the iron core materials 3 and the like from the base material 12, an uncoiler on which the coiled base material 12 is set and uncoiling the base material 12, a feeder which intermittently feeds the base material 12 to the press machine while correcting curls of the base material 12 to be uncoiled by the uncoiler.

The press machine is provided with a plurality of dies (not shown). Each die has a cutting blade corresponding to a configuration of a part to be die-cut, such as the iron core material 3. In this case, the press machine die-cuts an iron core material 3 from a predetermined part of the base material 12 by one die-cutting operation by the use of one die, that is, by pressing.

The press machine has n number of dies arranged in the widthwise direction of the base material 12. In this case, n is set to an integer that is not less than 2. In the embodiment, n is set to 2. Furthermore, six dies are arranged in each row in the lengthwise direction of the base material 12 in the press machine, that is, the press machine is provided with twelve dies in total. These dies are arranged in two rows in the widthwise direction of the base material 12 with each row including six dies.

The six dies arranged in one row in the lengthwise direction of the base material 12 differ in a location where the iron core material 3 or the like is die-cut. Accordingly, when the base material 12 is sequentially fed and pressed, the entire iron core materials 3 and the like are finally die-cut, whereby the iron core materials 3 and the like are obtained from the base material 12. In this case, two dies are arranged in the widthwise direction of the base material 12 in the press machine. As a result, two iron core materials 3, etc. are obtained from the base material 12 every time of pressing.

Figure 4:
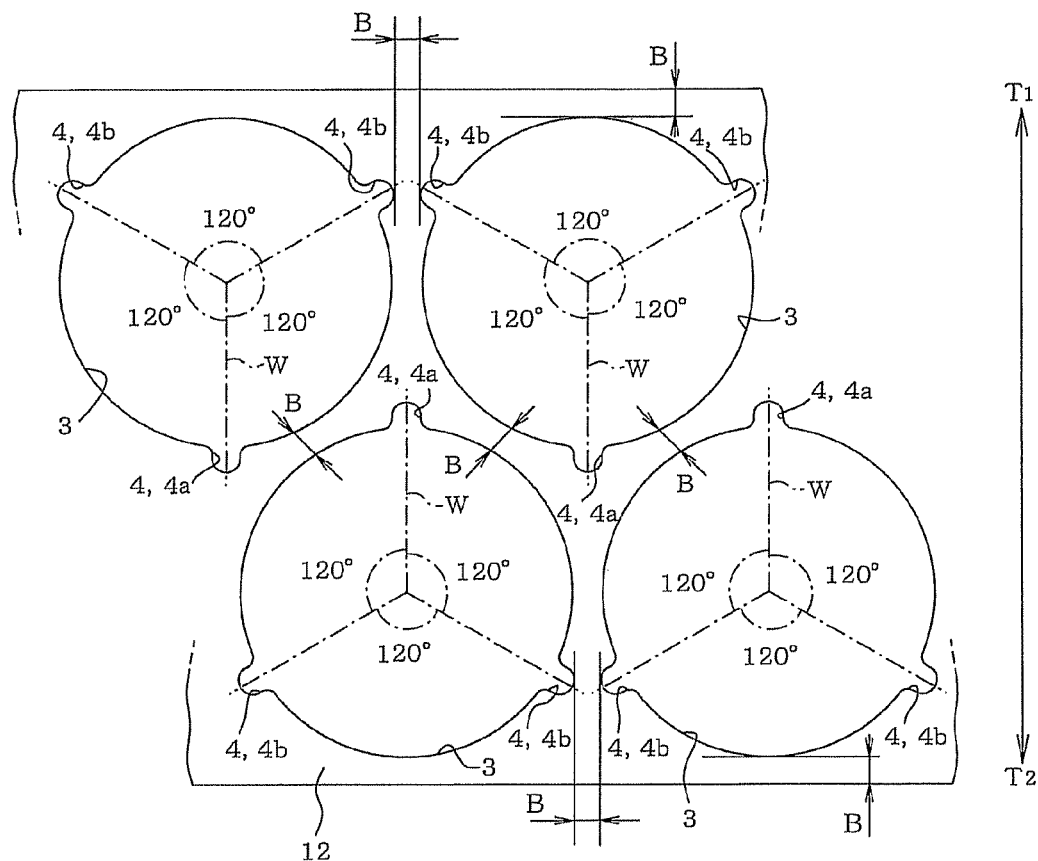
FIG. 4 is a schematic plan view showing positions where the iron core materials are die-cut from the base material.

FIG. 4 shows locations of the iron core materials 3 to be die-cut from the base material 12. In FIG. 4, the left side is an upstream side with respect to a direction in which the base material 12 is fed in the die-cutting process, and the right side is a downstream side. In FIG. 4, the iron core materials 3 to be die-cut from one base material 12 are arranged in n number of rows in the widthwise direction of the base material 12 when n is an integer that is not less than 2. In this case, since n=2, the iron core materials 3 are arranged in two rows and die-cut. Furthermore, the press machine is constructed to feed the base material 12 and press the base material 12 by dies thereby to die-cut the iron core materials 3. As a result, the iron core materials 3 to be die-cut from the base material 12 are in the same row and have the same configuration.

Figure 2:
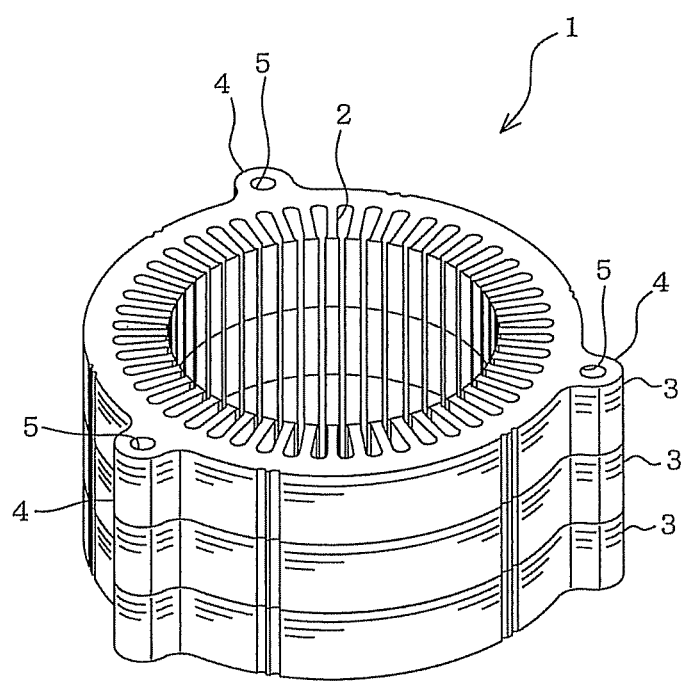
FIG. 2 is a perspective view of an appearance of stator core.

In FIGS. 1A and 4, a first row refers to a row which is located at the upper side and in which parts thereof corresponding to the iron core materials 3 are arranged in the right-left direction. A row adjacent to the first row refers to a row which is located at the lower side and in which parts corresponding to the iron core materials 3 are arranged in the right-left direction. The iron core materials 3 to be die-cut from the first row and the row adjacent to the first row are arranged in a zigzag manner. More specifically, the iron core materials 3 to be die-cut from the first row are located at the upstream side substantially by a radius of each iron core material 3 in the lengthwise direction of the base material 12 relative to the iron core materials 3 to be die-cut from the row adjacent to the first row. The upstream side refers to the left side in FIGS. 1A and 4. The parts of the base material 12 corresponding to the respective iron core materials 3 to be die-cut are also designated by reference numeral 3 in FIGS. 1A and 4. Parts corresponding to the lugs 4 are designated by reference symbols 4, 4a and 4b. Of the rows adjacent to each other in the widthwise direction of the base material 12, the first row located at the upper side in FIG. 1 is referred to as "row P", and the row adjacent to row P or the row located at the lower side in FIG. 1 is referred to as "row Q". In this case, of widthwise ends of the base material 12, the end located at row P side has a sheet thickness $T_1$ and the end located at row Q side has a sheet thickness $T_2$.

The lugs 4 formed in the iron core materials 3 of each row will be described in detail. For example, three iron core materials 3 are die-cut from row P. Each iron core material 3 has lugs 4 including at least one corresponding to a part of the base material located between parts of the base material 12 corresponding to two lengthwise adjacent iron core materials 3 in row Q. Furthermore, three iron core materials 3 are die-cut from row Q. Each iron core material 3 has lugs 4 including at least one corresponding to a part of the base material located between parts of the base material 12 corresponding to two lengthwise adjacent iron core materials 3 in row P. In the following description, reference symbol "4a" designates the lug located between the parts of the base material 12 corresponding to two iron core materials 3 to be die-cut. The other lugs of each iron core material 3 will be referred to as "lugs 4b."

Directions in which the lugs 4 in the iron core materials 3 in row P protrude correspond with one another with respect to a direction parallel to the widthwise direction of the base material 7, that is, directions in which lines W extend, respectively. Also, directions in which the lugs 4 in the iron core materials 3 in row Q protrude correspond with one another with respect to a direction parallel to the widthwise direction of the base material 7, that is, directions in which lines W extend, respectively. Furthermore, the lugs 4a in row P are located nearer the row Q side than line $L_C$ of the base material 12. The lugs 4a in row Q are located nearer the row P side than line LC of the base material 12. More specifically, the lugs 4a in row P are located nearer row Q than parts of the iron core materials 3 which are to be die-cut from row Q and are located nearest row P side. Furthermore, the lugs 4a in row Q are located nearer row P than parts of the iron core materials 3 which are to be die-cut from row P and are located nearest row Q side.

Parts of each iron core material 3 corresponding to the respective lugs 4b are circumferentially located 120° away from the lug 4a on the outer circumference of each iron core material 3. More specifically, in each one iron core material 3, the directions in which each iron core material 3 extends and each one of the two lugs 4b protrudes make an angle of 120° with the other. Also, the direction in which each lug 4a protrudes makes an angle of 120° with the direction in which each lug 4b protrudes. Furthermore, m=3 and the lugs are arranged circumferentially at regular intervals on the outer circumference of each iron core material 3 in the embodiment. As a result, the lugs 4b are located outside (upper side in FIG. 1) a line $L_1$ horizontally passing the centers of the iron core materials 3 in row P or located at the end side where the thickness of the base material 12 is set at $T_1$. In this case, since m is an odd number, no lugs 4b in row P at the circumferential side opposite the lugs 4a on the basis of the centers of the iron core materials 3. Furthermore, the outer circumferences of the iron core materials 3 include respective parts located nearest the ends of the base material 12. No lugs 4b in row P are located at these parts of the outer circumferences of the iron core materials 3. In row P, furthermore, the iron core materials 3 are adjacent to each other in the lengthwise direction of the base material 12. A distance or interval between the lugs 4b of the adjacent iron core materials 3 is shorter than a distance or interval between the outer circumferences of the adjacent iron core materials 3.

The lugs 4b of each iron core material 3 in row Q are also circumferentially located 120° away from the lug 4a on the outer circumference of each iron core material 3. Furthermore, the lugs 4b of each iron core material 3 are located outside the line $L_1$ passing the center of each iron core material 3 (lower than the line $L_1$ in FIG. 1) or at the side of the end where the base material 12 has the thickness of $T_2$. In this case, no lugs 4b in row Q are located at the circumferential side opposite the lugs 4a on the basis of the centers of the iron core materials 3 in the same manner as in row P. Furthermore, the outer circumferences of the iron core materials 3 include respective parts located nearest the ends of the base material 12. No lugs 4b in row Q are located at these parts of the outer circumferences of the iron core materials 3. In row Q, furthermore, the iron core materials 3 are adjacent to each other in the lengthwise direction of the base material 12. A distance or interval between the lugs 4b of the adjacent iron core materials 3 is shorter than a distance or interval between the outer circumferences of the adjacent iron core materials 3.

A marginal region called "web width" is provided in a part of the base material 12 located between the iron core materials 3 to be die-cut and a part of the base material 12 located between each iron core material 3 and each end of the base material 12. The marginal region has a predetermined dimension B. More specifically, die-cutting of the iron core materials 3 from the base material 12 sometimes results in a remaining material. When the remaining material includes a part tending to be narrower, the narrower part is provided with a marginal region in order that the remaining materials may be joined together after the iron core materials 3 have been die-cut from the base material 12. The marginal region is set to be at least not less than the above-mentioned web width or the dimension B. In the embodiment, the base material 12 includes parts between the lugs 4b of the lengthwise adjacent iron core materials 3 in each row, parts between the iron core materials 3 in row P and the iron core materials 3 in row Q and parts between each iron core material 3 and ends of the base material 12. Since these parts tend to be narrower, each part is provided with the marginal region that is not less than the web width or the dimension B. Thus, each part tending to be narrower is set at a dimension as close as possible to the web width or the dimension B.

Furthermore, the lug 4a of each iron core material 3 in row P is located between the iron core materials 3 which are adjacent to each other in the lengthwise direction in row Q. The lug 4a of each iron core material 3 in row Q is also located between the iron core materials 3 which are adjacent to each other in the lengthwise direction in row P. This results in an increase in a distance between the lug 4a of one iron core material 3 in row P and the outer circumference of another iron core material 3 in row Q. The distance tends to be longer than the web width or the dimension B. Accordingly, it is desirable that the distance between outer circumstances of the iron core materials 3 adjacent in the widthwise direction of the base material 12 should be as close as possible to dimension B that is the web width. As a result, the widthwise dimension of the base material 12 can be rendered shorter. This can increase a ratio of an area of each iron core material 3 to an area of the base material 12 and further reduce an amount of remaining material resulting from die-cutting of the iron core materials 3 from the base material 12, that is, an amount of remaining material 12' as shown in FIG. 1.

The die-cutting process will be described in more detail. In the die-cutting process, the iron core materials 3 constituting the stator core 1 and iron core materials 13 constituting a rotor core (not shown) are die-cut from the base material 12 as shown in FIG. 1. Each iron core material 13 is die-cut from the inside of a part of the base material 12 corresponding to each iron core material 3. In FIG. 1, arrow A designates a feed direction in the die-cutting process. Reference numeral "13" designates a part from which each iron core material 13 of the rotor core is die-cut. The left side in FIG. 1 will be referred to as "upstream side" and the right side in FIG. 1 will be referred to as "downstream side." Reference symbols S1 to S6 in FIG. 1 designate step numbers indicative of the number of die-cutting operations by the pressing of the press machine. More specifically, the iron core materials 3 and the iron core materials 13 are die-cut by execution of six times of die-cutting operations in the die-cutting process. The base material 12 is intermittently fed to the downstream side of the lengthwise direction, that is, in the direction of arrow A by the aforementioned feeder every time the die-cutting operation is carried out. In this case, a feed amount of the base material 12 at every die-cutting operation is set to a distance obtained by adding the web width or dimension B to the length of each iron core material 3.

Steps S1 to S6 will be described. In step S1 of the die-cutting process, holes 21 are formed by die-cutting most upstream portions corresponding to both ends of the base material 12 by the press machine. The holes 21 are located at predetermined intervals in the lengthwise direction of the base material 12. In this case, the predetermined intervals correspond substantially with an interval obtained by adding the web width or dimension B to the length of each iron core material 3. In this case, furthermore, the holes 21 formed in one of two widthwise ends of the base material 12 are away, by a predetermined distance, from the holes 21 formed in the other widthwise end of the base material 12 in the lengthwise direction of the base material 12. The predetermined distance corresponds substantially with a radius of the outer circumference of each iron core material 3. The holes 21 serve as positioning holes determining die-cutting positions of the iron core materials 3 and 13. In other words, the iron core materials 3 and 13 are die-cut from respective parts located between the holes 21 in the base material 12.

In step S2 of the die-cutting process, holes 22 are formed by pressing the centers of parts of the base material 12 from which the iron core materials 3 are to be die-cut. Holes 5 of the iron core material 3 and holes 23 of the iron core material 13 are further formed by pressing. The hole 22 serves to determine central positions of the iron core materials 3 and 13. In the embodiment, since n=2, two holes 22 are formed in the widthwise direction of the base material 12 so that the iron core materials 3 are die-cut from two rows or rows P and Q. Furthermore, the holes 22 in the rows P and Q are away, by a predetermined distance, from each other in the lengthwise direction of the base material 12. In this case, the predetermined distance substantially corresponds with the radius of the iron core material 3. As a result, the holes 22 are formed in a zigzag manner.

The holes 5 are formed at regular intervals on imaginary circles with the holes 22 as centers. More specifically, of three holes 5, the hole 5a which is formed so as to correspond to the lug 4a of the iron core material 3 is located between the parts of the base material 12 corresponding to the iron core materials 3 adjacent to each other in the lengthwise direction in the adjacent row. The hole 5a is further located on line W. Furthermore, the hole 5b is formed so as to correspond to the part from which the lug 4b of the iron core material 3 is to be die-cut. The hole 5b is located circumferentially 120° away from the aforementioned hole 5a on the basis of the center of the iron core material 3 to be die-cut with respect to the outer circumference of the iron core 3.

The holes 23 serve as holes of the rotor core into which permanent magnets are to be inserted, as holes to adjust a magnetic path of the rotor, and the like. The holes 23 are formed circumferentially at regular intervals about the holes 22.

In the next step S3 of the die-cutting process, slots 2 of the iron core material 3 and shaft insertion holes 24 of the iron core material 13 are formed by die-cutting. Each shaft insertion hole 24 has an opening that is set to be larger than an opening of each hole 22.

In the next step S4 of the die-cutting process, a part of the base material 12, which serves as an inner circumference of the iron core material 3 or a part of the base material 12, which serves as an outer circumference of the iron core material 13 are formed by die-cutting. As a result, the iron core material 13 is obtained.

In the next step S5 of the die-cutting process, a part of the base material 12 which serves as an outer circumference of the iron core material 3 is die-cut by the press machine with the result that the iron core material 3 is obtained. In this case, the base material 12 has a thickness deviation. Accordingly, the iron core material 3 die-cut from the base material 12 also has a thickness deviation.

The remaining material 12' remaining after the iron core material 3 has been die-cut has a marginal region of equal to or larger than dimension B which is the web width, as described above. Accordingly, the remaining material 12' or the part other than the die-cut part is continuous. The remaining material 12' is thus continuous into an integral body. This can eliminate slack caused in the remaining material 12' as much as possible by pulling the remaining material 12', whereupon the base material 12 can easily be fed in the direction of arrow A.

In the next step S6 of the die-cutting process, the remaining material 12' is properly cut.

After the above-described die-cutting process, a stacking process is executed. In the stacking process, a number of obtained iron core materials 3 are stacked in the thickness direction. In the stacking process, in view of the thickness deviation of the iron core materials 3, the iron materials 3 are circumferentially (360°÷m) displaced from every predetermined number of iron core materials 3 or every 120° since m=3 in the embodiment. Alternatively, the iron core materials 3 are displaced from every predetermined number circumferentially by 120° and further reversed to be stacked, with the result that the obtained stator core 1 is less affected by the thickness deviation of the iron core materials 3. Accordingly, the stator core 1 has a substantially constant axial dimension. Furthermore, the iron core materials 3 are stacked so that burrs formed on the outer circumferences of the iron core materials 3 during the die-cutting are located axially inside the completed stator core 1.

A connecting process is executed after the stacking process. In the connecting process, a binding tube is inserted into the hole 5 of the iron core materials 3 and expanded. As a result, a number of iron core materials 3 are connected together in the stacking direction thereby to be integrated, and the stator core 1 is obtained in which a number of iron core materials 3 are integrated together.

A number of iron core materials 13 obtained in the die-cutting process are also stacked in the direction of plate thickness to be integrated in the stacking direction, with the result that a rotor core (not shown) is obtained. The iron core materials 13 are also circumferentially (360°÷m) displaced from every predetermined number of iron core materials 13 or every 120° since m=3 in the embodiment. Alternatively, the iron core materials 13 are displaced from every predetermined number circumferentially by 120° and further reversed to be stacked, with the result that the obtained rotor core is less affected by the thickness deviation of the iron core materials 13.

Furthermore, permanent magnets are provided in the holes 23 and a shaft is inserted through a shaft insertion hole 24, whereby a rotor is obtained. Furthermore, coils are inserted into the slots 2 of the stator core 1 with the result that the stator is obtained. A rotating electrical machine is obtained from the rotor and the stator.

The above-described first embodiment can achieve the following advantageous effect. The part of the base material 12 from which the iron core material 3 is die-cut in the die-cutting process is arranged in n number of rows in the widthwise direction of the base material 12 which is a band-shaped magnetic steel sheet, when n is an integer not less than 2, and in this case, the part is arranged in two rows since n=2. The part of the base material 12 from which the lug 4a is die-cut in one row is located between the parts of the base material 12 from which the two lengthwise adjacent iron core materials 3 in the adjacent or other row are die cut. As a result, a sufficient distance can be ensured between the part of the base material 12 from which the lug 4a is die-cut in one row and the parts of the base material 12 from which two iron core materials 3 are die-cut in the other row, and the part of the base material 12 from which the iron core material 3 is die-cut can be located closer to the part of the base material 12 from which the iron core material 3 is die-cut in the other row, and vice versa. This can reduce the widthwise dimension of the base material 12. Furthermore, a ratio of the area of the iron core materials 3 to the area of the base material 12 can be increased, and an amount of the remaining material 12' which remains after the iron core materials 3 have been die-cut can be reduced. Accordingly, the yield of the material of the stator core 1 when the stator core 1 is constructed by stacking the iron core materials each having the lugs 4.

Furthermore, the part of the base material 12 from which the lug 4a is die-cut in one row is located near the parts of the base material 12 from which the iron core materials 3 are die-cut in the other row. This can reduce an amount of remaining material 12' caused on the periphery of the part of the base material 12 from which the lug 4a is die-cut.

Furthermore, m, namely, the number of lugs in each iron core material 3 is set to an odd number so that the lugs are located circumferentially at regular intervals. As a result, the lug 4a is not located circumferentially opposite the lug 4a on the basis of the center of the iron core material 3. This can reduce the dimension between the iron core material 3 and each widthwise end of the base material 12, resulting in further reduction in the widthwise dimension of the base material 12.

Furthermore, the remaining material 12' resulting from die-cutting the iron core materials 3 from the base material 12 is continuous into an integral body. Accordingly, the remaining material 12' can easily be pulled downstream or in the direction of arrow A in FIG. 1. This can eliminate slack caused in the base material 12 fed by the press machine during the die-cutting process as much as possible, resulting in an improvement in the working efficiency.

Furthermore, burrs formed on the outer circumferences of the iron core materials 3 during the die-cutting are located axially inside the completed stator core 1. This can prevent the burrs from protruding from the stator core 1.

Figure 5:
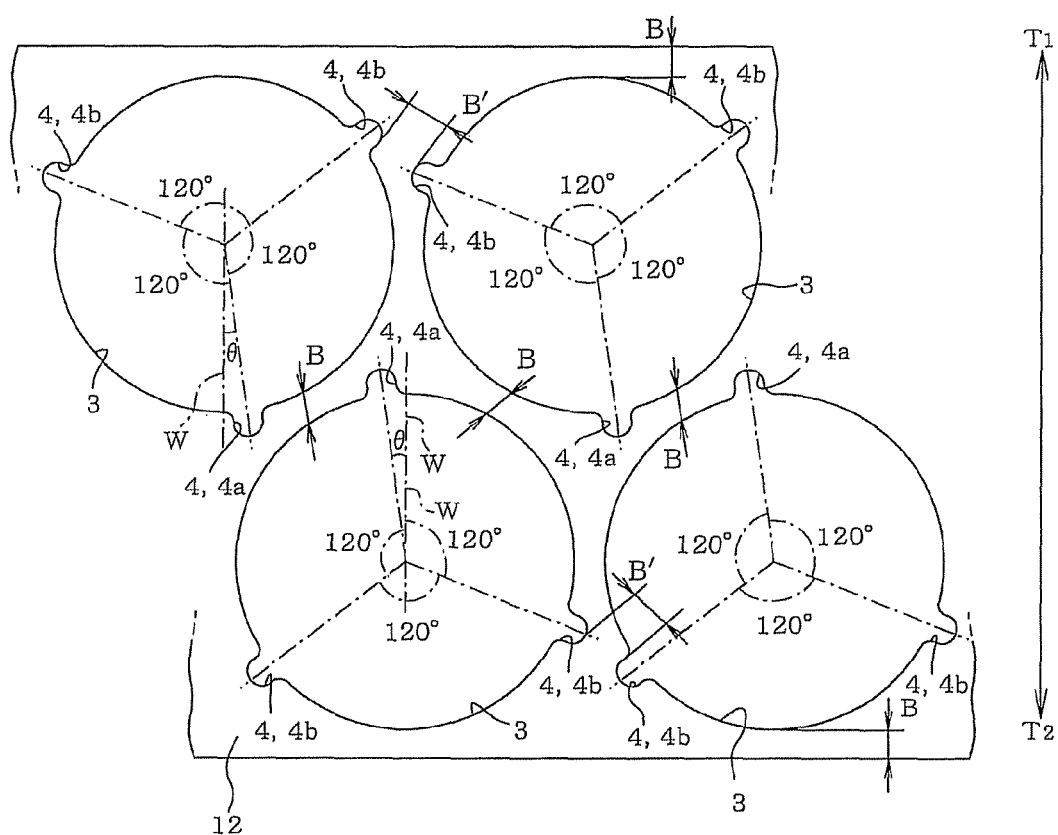
FIG. 5 is a view similar to FIG. 4, showing a second embodiment.

A second embodiment will be described with reference to FIG. 5. "M" is set to an integer that is not less than 2, or desirably an odd number that is not less than 3, or more desirably 3. The case where m=3 will be described in the second embodiment. Furthermore, the lugs 4 are located circumferentially at regular intervals.

The second embodiment differs from the first embodiment in the location where the iron core material 3 is die-cut from the base material 12. More specifically, in the die-cutting process in the second embodiment, the direction in which the lug 4a of the iron core material 3 protrudes is inclined by angle θ relative to the widthwise direction of the base material 12 or a line W passing the center of the iron core material 3.

More specifically, the direction in which the lug 4a included in one row or row P in this case protrudes or the direction in which a line connecting between the center of the iron core material 3 included in row P and the lug 4a is directed downstream by angle θ relative to the line W passing the center of the iron core material 3. The angle θ desirably exceeds 0° and is not more than 20°. The angle θ is more desirably set to be not less than 5° and not more than 15°. Furthermore, the lugs 4b of the iron core material 3 included in row P are located circumferentially at regular intervals from the lug 4a on the outer circumference of the iron core material 3 or, in this case, 120° away from the lug 4a.

The direction in which the lug 4a included in the next row or row Q in this case or the direction in which a line connecting between the center of the iron core material 3 included in row Q and the lug 4a is directed upstream by angle θ relative to the line W passing the center of the iron core material 3. The angle θ desirably exceeds 0° and is not more than 20°. The angle θ is more desirably set to be not less than 5° and not more than 15°. Furthermore, the lugs 4b of the iron core material 3 included in row P are located circumferentially at regular intervals from the lug 4a on the outer circumference of the iron core material 3 or, in this case, 120° away from the lug 4a.

According to the second embodiment, the lug 4a is circumferentially displaced by angle θ as compared with the first embodiment. Reference symbol B' designates a dimension between parts of the base material 12 from which are die-cut lugs 4b of the iron core materials 3 adjacent to each other in the lengthwise direction of the base material 12, respectively. The dimension B' is larger than dimension B that is a web width in the first embodiment. This can improve the strength of the remaining material 12' produced between the iron core materials 3 adjacent to each other in the lengthwise direction.

Furthermore, it is better that the dimension B' is approximated to the dimension B or the web width. This can reduce the lengthwise dimension of the base material 12 and increase a ratio of an area of each iron core material 3 to an area of the base material 12 and further reduce an amount of remaining material resulting from die-cutting of the iron core materials 3 from the base material 12, that is, an amount of remaining material 12'. Consequently, when the iron core materials 3 having the lugs 4 are stacked to be formed into the stator core 1, the yield of the base material 12 serving as a material can be further improved.

In particular, it is better that the angle θ is set so as to exceed 0° and be not more than 20° or more desirably, so as to be not less than 5° and not more than 15°. Dimensions are measured between the lugs 4b and the outer circumferences of the iron core materials 3 adjacent to each other in the lengthwise direction of the base material 12. The dimensions can be rendered larger than the dimension B or the web width. Furthermore, a dimension between iron core materials 3 adjacent to each other can also be rendered larger than the dimension B or the web width. The parts of the base material 12 from which the iron core materials 3 are die-cut are arranged so as to be closer to each other so that the aforementioned dimensions are approximated to the dimension B or the web width. This can further reduce the lengthwise and widthwise dimensions of the base material 12, whereupon the yield of the base material 12 serving as the material can further be improved.

Figure 6:
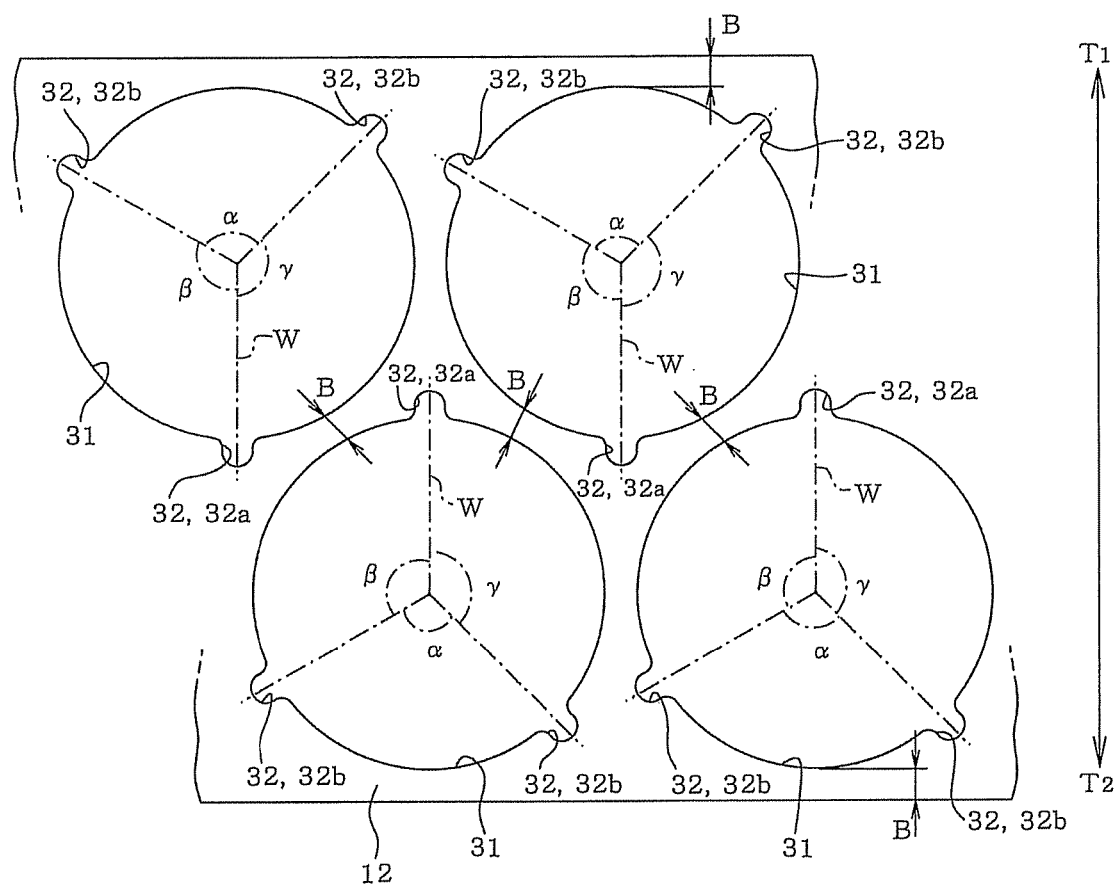
FIG. 6 is a view similar to FIG. 4, showing a third embodiment.

A third embodiment will be described with reference to FIG. 6. In FIG. 6, the left side of the base material 12 is referred to as an upstream side in the feed direction of the base material 12 and the right side of the base material 12 is referred to as a downstream side.

The iron core material 31 in the third embodiment differs from the iron core material 3 in the first and second embodiments in the locations of the lugs 32, as shown in FIG. 6. More specifically, the lugs 4 are circumferentially formed on the outer circumference of the iron core materials 3 at regular intervals in the first embodiment. In the third embodiment, however, the lugs 32 are circumferentially formed at irregular intervals, or the lengths between the circumferentially adjacent lugs 32 are not equal to one another.

The case where m=3, that is, the case of three lugs 32 will be described in the following. The three lugs 32 are formed on the outer circumference of each iron core material 31 so as to have intervals of angles α, β and γ. In this case, the angles α, β and γ are set so that at least one of the three angles differs from the others. All the angles differ from one another in the embodiment, and more specifically, α=110°, β=120° and γ=130°. Furthermore, a part of the base material 12 corresponding to each lug 32a is located between the circumferentially adjacent iron core materials 3 in the adjacent row in the third embodiment. Still furthermore, the lugs 32b constitute the lugs 32 other than the lug 32a in each iron core material 31. In this case, the lug 32a protrudes in the same direction that the line W in FIG. 6 extends. The aforementioned angle α is made between the directions in which the two lugs 32b protrude. Angle β is made between the direction in which the lug 32a protrudes and the direction in which the upstream lug 32b protrudes. Angle γ is made between the direction in which the lug 32a protrudes and the direction in which the downstream lug 32b protrudes.

The holes that are the same as the holes 5 in the first embodiment are formed in the third embodiment although not shown.

The following describes a procedure in which the iron core materials 31 thus constructed are stacked into a stator core. A method of manufacturing the stator core in the third embodiment is substantially the same as in the first embodiment. More specifically, the iron core materials 31 are die-cut from the base material 12 in the die-cutting step. In the stacking step, a predetermined number of iron core materials 31 obtained from one row is stacked and a predetermined number of iron core materials 31 obtained from the adjacent row is also stacked. In this case, in order that three lugs of the respective iron core materials 31 may overlap one another, the iron core materials 31 are reversed when stacked onto the iron core materials 31 obtained from the first row. More specifically, when a predetermined number of iron core materials 31 obtained from the first row is stacked, and the predetermined number of iron core materials 31 obtained from the adjacent row is stacked in a reversed state onto the previously stacked iron core materials 31 from the first row.

As a result, the stator core (not shown) is formed by stacking the iron core materials 31 so that parts obtained from the base material 12 side having the thickness $T_1$ overlap the parts obtained from the base material 12 side having the thickness $T_2$. The stator core thus obtained becomes unsusceptible to an adverse effect of thickness deviation as much as possible. As a result, the stator core has an axial dimension that is substantially constant. Furthermore, the iron core materials 31 are stacked together in the stacking step so that burrs formed on the outer circumferences of the iron core materials 31 during the die-cutting are located axially inside the completed stator core.

In the above-described construction, even when the lugs 32 of the iron core materials are not located circumferentially at regular intervals, the lug 32a of each iron core material 31 die-cut from the first row is located between the parts of the base material 12 corresponding to the circumferentially adjacent iron core materials 31 in the adjacent row. Consequently, a sufficient distance can be obtained between the part of the base material 12 from which the lug 32a is to be die-cut in the first row and the part of the base material 12 from which the lengthwise adjacent iron cores are to be die-cut, whereupon the base material 12 part from which each iron core material 31 is to be die-cut in the first row can be caused to come closer to the base material 12 part from which each iron core material 31 is to be die-cut in the adjacent row. This can render the widthwise dimension of the base material 12 as short as possible. Furthermore, since a ratio of an area of the iron core materials 31 to an area of the base material 12 is increased, an amount of remaining material 12' resulting from the die-cutting can be reduced with the result of an improvement in the yield of the material of the stator core constructed by stacking the iron core materials 31 having the respective lugs 32.

Furthermore, even in each iron core material 31 with the lugs not located circumferentially at regular intervals, the burrs formed on the iron core materials 31 are located axially inside the completed stator core. Consequently, the burrs can be prevented from protruding from the stator core.

In the method of manufacturing the stator core according to the embodiment, the parts of the base material 12 from which the iron core materials are die-cut are arranged in n number of rows in the widthwise direction of the base material or the band-shaped magnetic steel sheet when n is an integer not less than 2. The first row includes a base material 12 part from which at least one of the lugs of each iron core material is to be die-cut. The part is located between the base material 12 parts from which the lengthwise adjacent two iron core materials 31 are to be die-cut in the row adjacent to the first row. As a result, a sufficient distance can be ensured between the part of the first row from which the lug is to be die-cut and the parts of the adjacent row, and the base material 12 part from which each iron core material 31 is to be die-cut in the first row can be caused to come closer to the base material 12 part from which each iron core material 31 is to be die-cut in the adjacent row. This can render the widthwise dimension of the base material 12 as short as possible. Furthermore, since a ratio of an area of the iron core materials 31 to an area of the base material 12 is increased, an amount of remaining material 12' resulting from the die-cutting can be reduced with the result of an improvement in the yield of the material of the stator core constructed by stacking the iron core materials 31 having the respective lugs 32.

In the foregoing embodiment, furthermore, the case where m=3 have been described in detail. However, even when m is set to 2 or an integer equal to 4 or above 4, the base material part from which at least one of the lugs is to be die-cut is arranged so as to correspond to the part from which the lug 4a is to be die-cut in the first embodiment, whereby in the region of the base material from which the iron core materials are to be die-cut, the part from which the iron core material is to be die-cut in the first row can be caused to come closer to the part from which the iron core material is to be die-cut in the adjacent row. Furthermore, an amount of remaining material resulting from the periphery of each part from which a lug arranged in the same manner as the lug 4a is to be die-cut can be reduced.

Parts of the magnetic steel sheet to be die-cut as the iron core materials may be arranged in n number of rows in the widthwise direction of the magnetic steel sheet when n is an integer equal to or larger than 3. In this case, at least 2 of the n number of rows that is equal to or larger than 3 are arranged in the same manners as the above-described rows P and Q. As a result, an amount of remaining material caused after the die-cutting can be reduced between rows P and Q.

The binding pipe has been disclosed as an example of the connecting member. However, the connecting member should not be limited to the binding pipe. For example, the connecting member may be comprised of a bolt and nut. In this case, the opening of the hole is set to be such that the bolt is insertable into the hole.

FIGS. 1 and 4 show the case where row P is an upper row and row Q is a lower row as an example. However, row P may be a lower row and row Q may be an upper row. This case can achieve the same advantageous effect as described above.

In the second embodiment, the direction in which the lug protrudes in the first row may be the same as in the adjacent row.

The case where angles α, β and γ differ from one another has been described in the third embodiment. However, at least one of angles α, β and γ may be set so as to differ from the others, for example, α=110°, β=125° and γ=125°.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:
1. A method of manufacturing a stator core, comprising:
die-cutting iron core materials from a band-shaped magnetic steel sheet, each iron core material being formed into an annular shape and having an inner circumference formed with a plurality of slots and three interconnecting lugs, each lug being formed into a rectangular shape extending radially outward from an annular outer circumference of the magnetic steel sheet, each lug having a distal end formed into a semicircular arc shape; and
stacking a number of the iron core materials,
wherein in the die-cutting, the magnetic steel sheet includes parts to be die-cut as the iron core materials, and the parts are arranged in two rows in a widthwise direction of the magnetic steel sheet;
at least one of the lugs included in one of the two rows is located between the iron core materials lengthwise adjacent to each other in the other row; and
marginal regions are provided in parts of the magnetic steel sheet located between the lugs of the iron core materials adjacent to each other in a lengthwise direction of the magnetic steel sheet in a common row, between the iron core material of the one row and the iron core material of the other row and between the iron core materials to be die-cut and each end of the magnetic steel sheet, respectively, the marginal regions being sized to be approximate to a web width in order to join remaining materials after the iron core materials have been die-cut from the magnetic steel sheet.
2. The method according to claim 1, wherein the lugs of the iron core material located between the lengthwise adjacent iron core materials in the next row include at least one lug protruding in a direction inclined by an angle θ with respect to the widthwise direction of the electromagnetic steel sheet.

3. The method according to claim 2, wherein the angle θ is larger than 0° and not more than 20°.

4. A stator core which is constructed by stacking a number of iron core materials die-cut from a band-shaped magnetic steel sheet, wherein:

each one of the iron core materials is formed into an annular shape and has an inner circumference formed with a plurality of slots;

each iron core material has three interconnecting lugs, each lug being formed into rectangular shape extending radially outward from an annular outer circumference of the magnetic steel sheet, each lug having a distal end formed into a semiconductor arc shape;

the magnetic steel sheet includes parts to be die-cut as the iron core materials, and the parts are arranged in two rows in a widthwise direction of the magnetic steel sheet;

at least one of the lugs included in one of the two rows is located between the iron core materials lengthwise adjacent to each other in the other row; and marginal regions are provided in parts of the magnetic steel sheet located between the lugs of the iron core materials adjacent to each other in a lengthwise direction of the magnetic steel sheet in a common row, between the iron core material of the one row and the iron core material of the other row and between the iron core materials to be die-cut and each end of the magnetic steel sheet, respectively, the marginal regions being sized to be approximate to dimensions of a web width in order to join remaining materials after the iron core materials have been die-cut from the magnetic steel sheet, whereby a number of the iron core materials die-cut from the magnetic steel sheet are constructed into the stator core.

\* \* \* \* \*